United States Patent Office 3,226,618
Patented Dec. 28, 1965

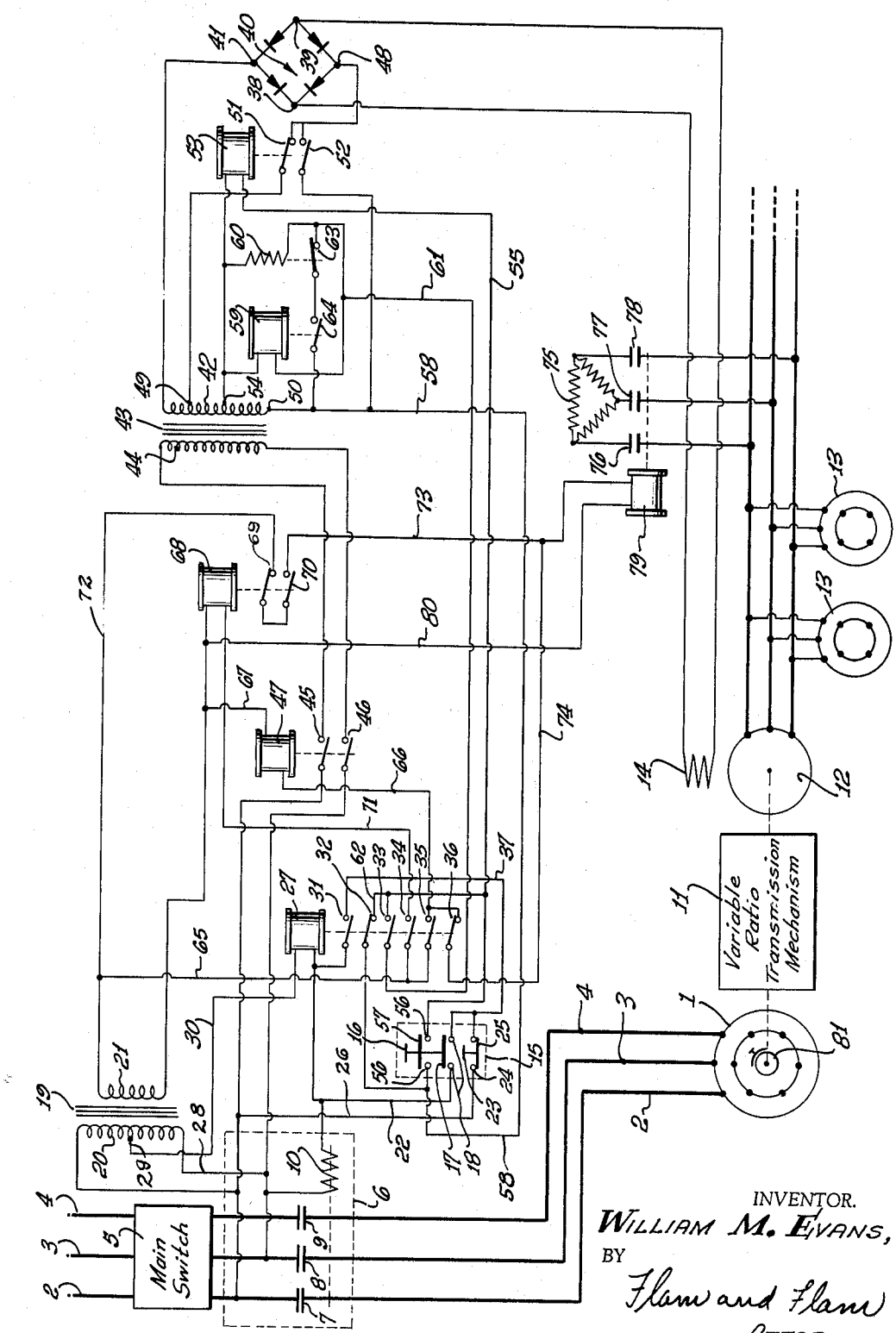

3,226,618
PLURAL MOTOR ALTERNATOR FED STOPPING AND BRAKING CONTROL SYSTEM
William M. Evans, La Habra, Calif., assignor, by mesne assignments, to Emerson Electric Co., a corporation of Missouri
Continuation of application Ser. No. 715,396, Feb. 14, 1958. This application Aug. 14, 1961, Ser. No. 131,716
8 Claims. (Cl. 318—62)

This invention relates to electric motors (e.g. induction motors) that are fed from a source, the frequency of which is adjustable.

Such systems are now in common use. One form includes a main motor fed from a commercial source, and driving a variable ratio transmission mechanism. The output of the mechanism in turn drives an alternator. Thus, by adjusting the ratio of the transmission mechanism, the frequency of the output of the alternator is correspondingly adjusted and the motors connected to the alternator operate at the adjusted speeds in unison.

In many applications, such "slave" motors are permanently connected to the alternator, so that all of them simultaneously accelerate or decelerate in accordance with the adjustment of the variable ratio transmission mechanism. Accordingly, the ratio of such mechanism is variable through a continuous range. A well-known form of transmission mechanism suitable for such use includes adjustable diameter pulley structures formed of relatively axially adjustable sections with opposed inclined faces, and cooperating with edge-active V-belts.

It is desirable at times to bring all of the slave motors simultaneously and smoothly to a stop, the motors operating substantially in unison. It is one of the objects of this invention to make it possible to shorten the time necessary to bring the system to a standstill, and particularly by the aid of dynamic braking.

It is still another object of this invention to provide for continued excitation for the alternator after the motor driving the alternator is deenergized, thereby obtaining dynamic braking effects. These effects may be augmented by temporarily increasing the excitation of the alternator, and optionally by applying a mechanical brake upon the driving motor.

It is still another object of this invention further to hasten the braking process by temporarily adding a load to the alternator.

This application is a continuation of my prior application Serial No. 715,396, filed February 14, 1958, now abandoned and entitled "Stopping and Braking of Dynamo-Electric Machines."

This invention possesses many other advantages, and has other objects which may be made more clearly apparent from a consideration of one embodiment of the invention. For this purpose, there is shown a form in the drawings accompanying and forming a part of the present specification, and which drawings, unless described as diagrammatic, or unless as otherwise indicated, are true scale. This form will now be described in detail, illustrating the general principles of the invention; but it is to be understood that this detailed description is not to be taken in a limiting sense, since the scope of this invention is best defined by the appended claims.

Referring to the drawings:

The single figure is a wiring diagram of a system incorporating the invention.

A driving induction motor 1 is shown as supplied from commercial mains 2, 3 and 4. These commercial mains are connected to the motor 1 through a main switch 5 and an electromagnetically-operated motor starting switch 6, having contact members 7, 8 and 9. When an electromagnet 10 is energized, the contact members 7, 8 and 9 close, and the motor 1 is energized.

The motor 1 operates a variable ratio transmission mechanism 11. This variable ratio transmission mechanism, as hereinabove stated, may include cone pulleys having adjustable effective diameters, cooperating with one or more edge-active V-belts.

The variable ratio transmission mechanism 11 serves to drive an alternator 12 at any adjusted speed within the limits of adjustment of the transmission mechanism 11. This alternator 12 may feed one or more "slave" induction motors 13 permanently connected to the output circuit of alternator 12.

The alternator 12 is provided with an exciter winding 14.

The system as thus far described is one that is well-known. The adjustment of the speed of the alternator 12 simultaneously causes corresponding adjustment in the speed of all the slave motors 13. Such a simultaneous and coordinated speed adjustment is useful in many processes; e.g., for windup of webbing or the like.

In the system now to be described, the slave motors 13 may be brought to a standstill expeditiously by the aid of dynamic braking. The effect of the dynamic braking is augmented by temporarily increasing the excitation of the alternator 12.

Incorporated in the present system is apparatus for temporarily increasing the excitation of the alternator 12 during the starting period of motor 1. Such a system is described and claimed in a copending application filed on February 11, 1958, in the name of the present applicant under Serial No. 714,547, now Patent No. 3,077,559.

In order to provide low voltage controls for relays and other electromagnetically-operated circuit controllers, a transformer 19 is provided. The primary winding 20 is permanently connected across the mains 2 and 3. The secondary winding 21, as hereinafter described, serves to provide energy for certain of the operators or circuit controllers.

A start-and-stop push button mechanism 15 is provided for operating the electromagnet 10 either to energize or deenergize the motor 1 to cause it to start or to stop. A start button 16 is normally urged to the open position indicated in the drawing. When this push button is urged downwardly, a bridging conductor 17 carried by the push button 16 serves to bridge a pair of contact members 18. The circuit for the eletromagnet 10 is then completed as follows: from main 3, electromagnet 10, conductor 22, contacts 18 and bridging conductor 17, contacts 24 and bridging conductor 25 of stop push button 23, connection 26, to main 2. The stop push button 23 is normally in a closed position indicated, and may be opened by depressing it.

The circuit for the electromagnet 10 may include circuit controllers responsive to any unsafe condition that may arise in the motor circuits, such as overheating, overloading, or the like, for opening the electromagnet circuit.

When the push button 16 is depressed, another circuit is completed for energizing a relay 27. This circuit may be traced as follows: from main 2, upper terminal of winding 20, center tap 29, connection 30, relay 27, connection 22, contacting members 17 and 18, stop button conducting elements 24 and 25, connection 26, back to the main 2. Thus the relay 27 is fed with a voltage from the upper half of the primary winding 20 which is about one-half that existing across the mains 2 and 3.

The relay 27 controls the contacts 31, 32, 33 34, 35 and 36. Contacts 31, 33, 34 and 35 are normally open;

and contacts 32 and 36 are normally closed. The functions of these contacts will be explained hereinafter.

As soon as the relay 27 is energized, a holding circuit for the electromagnet 10, as well as for the relay 27 is completed, so that it is possible to release the button 16 and yet maintain the electromagnet 10 energized. The holding circuit for the relay 27 may be traced as follows: from main 3, conductor 28, lower half of winding 20, center tap 29, conductor 30, relay 27, contacts 31 (now closed), connection 37, stop push button contact members 24 and 25, and conductor 26 to main 2. The holding circuit for electromagnet 10 includes main 3, electromagnet 10, contacts 31, connection 37, push button contact members 24 and 25, and connection 26, to main 2.

From the foregoing, it is clear that stopping of the system can be effected by pushing the stop button 23 which open-circuits the holding connections as hereinabove described.

The field winding 14 for the alternator 12 is supplied from the output terminals 38 and 39 of a rectifier 40. One input terminal 41 is permanently connected to the upper terminal of a secondary winding 42 of a transformer 43. The primary winding 44 for this transformer is adapted to be connected across the mains 2 and 3 by the aid of normally open contacts 45 and 46. These normally open contacts are operated by a relay 47 in a manner to be hereinafter described. It is sufficient for the present to note that the contacts 45 and 46 are closed during normal operation of the system, and that they are kept closed for a short interval after the stop button 23 is operated. In this way, it is assured that the alternator field winding 14 will be energized not only during normal operation, but also for the purpose of effecting dynamic braking.

The other input terminal 48 of the rectifier 40 is optionally connected either to the tap 49 of the winding 42, or to the lower terminal 50 by the normally closed contacts 51 or the normally open contacts 52. When relay 53 is unenergized, the input terminals 41 and 48 are connected only across the top section of the winding 42, via contacts 51. However, when the relay 53 is energized, the contacts 51 open and the contacts 52 close, thereby increasing the input voltage by connecting the terminal 48 to the lower terminal 50 of the transformer winding 42.

When the start button 16 is operated, a circuit for energizing the relay 53 is completed as follows: from a tap 54 on secondary winding 42, relay 53, connection 55, contacts 56, bridge conductor 57 carried by the push button 16, connection 58, to the lower terminal 50 of the winding 42. As soon as this circuit is completed, circuits for a relay 59 and a thermal delay relay 60 are energized. These relays are in parallel with respect to the tap 54 of the winding 42, then via conductor 61, normally open contacts 33 of relay 27 (now presumed to be energized), conductor 62, push button contacts 56 and contacting bridge 57, and conductor 58 to the lower terminal 50 of the winding 42. This circuit is established while the push button 16 is depressed. However, there is a holding circuit as soon as relays 59 and 60 are energized, as follows: from the tap 54 through both relays 59 and 60 in parallel, normally closed contact 63 of relay 60, and normally open contact 64 of relay 59. The contacts 63 remain closed until thermal relay 60 heats up; and during this period, even after start button 16 is released, the relays 59 and 60 remain energized for a short period.

The relay 53 is also maintained energized for the same period, even after the push button 16 is released, through contacts 63 and 64, and this period is terminable when contacts 63 open. This energizing circuit for the relay 53 may be traced as follows: from the tap 54, relay 53, connections 55 and 62, normally open contacts 33 (now closed due to energization of relay 27), connection 61 and contacts 63 and 64, to the lower terminal 50 of coil 42.

The description thus far is substantially identical with the circuit hereinabove described in the said copending above-identified application.

As soon as relay 27 is energized, the relay 47 is likewise energized across the terminals of the secondary winding 21 of transformer 19. The energizing circuit for the relay 47 is as follows: from the upper terminal of winding 21, conductor 65, normally open contacts 35 of relay 27, connection 66, relay 47, and connection 67 to the lower terminal of the winding 21. This relay 47 thus closes the contacts 45 and 46, making it possible to energize the primary winding 44 of transformer 43.

A time delay relay 68 is provided. This relay has a normally closed contact 69 and a normally open contact 70. The normally closed contacts open and close instantaneously in response to the energization and deenergization of relay 68. However, contacts 70 delay opening upon deenergization of the relay 68.

Relay 68 is energized from the upper terminal of secondary winding 21, connection 65, normally open contact 34 of relay 27, connection 71, relay 68, to the lower terminal of winding 21.

A parallel energizing circuit is provided for the relay 47, to ensure that the transformer energizing contacts 45 and 46 will remain closed for a short period even after the relay 27 is deenergized; and it is for this purpose that relay contacts 69 and 70 are provided. Thus, the alternate energizing circuit for relay 47 may be traced from the upper terminal of winding 21, connection 72, normally closed contacts 69, normally open contacts 70 (which remain closed for a short interval after relay 68 is deenergized), connections 73 and 74, normally closed contact 36 of relay 27, connection 66, relay 47 and connection 67 to the lower terminal of the winding 21.

As thus described, therefore, the contacts 45 and 46 remain closed even after relay 68 drops out, through the time delay contact 70; and energization of the primary winding 44 continues. This ensures that the exciter winding 14 of the alternator 12 will remain energized during the stopping period, thereby providing dynamic braking.

After a short interval, the contacts 70 open, deenergizing the transformer primary 44 and the exciter winding 14. During the period of energization, the slave induction motors 13 rotate in unison and operate as loaded generators since they would coast by inertia at a speed in excess of the synchronous speed determined by the continuously and rapidly diminishing frequency of the alternator 12.

This stopping period is initiated by the operation of the stop push button 23, which deenergizes the relay 27, thus returning the motor energizing switch contacts 7, 8 and 9 to the open position, as well as relay 27. In dropping out, the relay 27 re-establishes the two normally closed contacts 32 and 36. The use of contacts 36 to hold in relay 47 has already been described. Contacts 32 are used in a manner now to be set forth.

During the period of dynamic braking, effective after the stop push button 23 is operated, increased energization of the exciter winding 14 is effected in order to augment the braking function. This is effected by energizing the relay 53 for a short time. This energizing circuit can be traced as follows: from the tap 54 of the winding 42, relay 53, connection 55, connection 62, normally closed contacts 32 of relay 27 (now deenergized) and connection 58, to the lower terminal 50 of the winding 42. This energization of the relay 53 increases the voltage applied across the input terminals 41 and 48 of the rectifier 40 as hereinabove described. This continues until the primary winding 44 is deenergized by the delayed opening of the relay 47 as hereinabove described.

If desired, the load on the alternator 12 may be temporarily increased during this slowing down period. This is effected by the aid of an impedance or impedances 75 connected across the mains of the alternator 12. In the present instance, these impedances are shown as delta-connected resistances. Normally open contacts 76, 77 and 78 during running conditions disconnect these impedances so as not to waste the electrical energy supplied by the alternator 12.

An electromagnet 79 when energized closes the contacts 76, 77 and 78 and connects the load 75 to the alternator 12. The circuit for this electromagnet 79 can be traced as follows: from the upper terminal of the secondary winding 21, connection 72, normally closed contacts 69, delayed opening contacts 70 of relay 68, connection 73, electromagnet 79, and connection 80 to the lower terminal of the winding 21. Since relay 68 is deenergized by the dropping out of relay 27, the normally closed contacts 69 are immediately effective and contacts 70 remain closed for a short interval. After this short interval, this circuit opens and the impedances 75 are disconnected.

Further to shorten the period of slowing down to a stop, mechanical braking on induction motor 1 may be provided. This indicated diagrammatically by the brake 81.

The inventor claims:

1. In a master speed control system including a speed changing device, an alternator driven by the device, said alternator having an exciter circuit for supplying exciting current for the alternator, and capable of being independently controlled to adjust the excitation, and one or more parallel fed motors connected to the alternator output for operation at a speed correlated to the speed at which the alternator is driven by said speed changing device, the combination therewith of: means controlling the application of power for driving said alternator to start and stop said system; time delay means movable from a first state to a second state upon operation of said controlling means to start said system, and from said second state to said first state upon the elapse of a predetermined period after operation of said controlling means to stop said system; means dependent upon the time delay means being in said second state for providing a supplemental power source; and circuit means operated by said power source for energizing said exciter circuit.

2. In a master speed control system including a speed changing device, an alternator driven by the device, said alternator having an exciter circuit for supplying exciting current for the alternator, and capable of being independently controlled to adjust the excitation, and one or more parallel fed motors connected to the alternator output for operation at a speed correlated to the speed at which the alternator is driven by said speed changing device, the combination therewith of: means controlling the application of power for driving said alternator to start and stop said system; time delay means movable from a first state to a second state upon operation of said controlling means to start said system, and from said second state to said first state upon the elapse of a predetermined period after operation of said controlling means to stop said system; means dependent upon the time delay means being in said second state for providing a supplemental power source; circuit means operated by said power source for energizing said exciter circuit; and means operable upon operation of said controlling means to stop said system and dependent upon said time delay means being in said second state for adding a substantial load to said alternator output.

3. In a master speed control system including a speed changing device, an alternator driven by the device, said alternator having an exciter circuit for supplying exciting current for the alternator, and capable of being independently controlled to adjust the excitation, and one or more parallel fed motors connected to the alternator output for operation at a speed correlated to the speed at which the alternator is driven by said speed changing device, the combination therewith of: means controlling the application of power for driving said alternator to start and stop said system; time delay means movable from a first state to a second state upon operation of said controlling means to start said system, and from said second state to said first state upon the elapse of a predetermined period after operation of said controlling means to stop said system; means dependent upon the time delay means being in said second state for providing a supplemental power source; means having alternate states for modifying the output of said supplemental power source between normal and high, and operable to cause high output upon operation of said controlling means to stop said system and upon the time delay means being in its said second state; and circuit means operated by said power source for energizing said exciter circuit.

4. In a master speed control system including a speed changing device, an alternator driven by the device, said alternator having an exciter circuit for supplying exciting current for the alternator, and capable of being independently controlled to adjust the excitation, and one or more parallel fed motors connected to the alternator output for operation at a speed correlated to the speed at which the alternator is driven by said speed changing device, the combination therewith of: means controlling the application of power for driving said alternator to start and stop said system; time delay means movable from a first state to a second state upon operation of said controlling means to start said system, and from said second state to said first state upon the elapse of a predetermined period after operation of said controlling means to stop said system; means dependent upon the time delay means being in said second state for providing a supplemental power source; means having alternate states for modifying the output of said supplemental power source between normal and high, and operable to cause high output upon operation of said controlling means to stop said system and upon the time delay means being in its said second state; means dependent upon operation of said controlling means to stop said system and said time delay means being in its said second state for adding a substantial load to said alternator output; and circuit means operated by said power source for energizing said exciter circuit.

5. In a master speed control system including a speed changing device, an alternator driven by the device, said alternator having an exciter circuit for supplying exciting current for the alternator, and capable of being independently controlled to adjust the excitation, and one or more parallel fed motors connected to the alternator output for operation at a speed correlated to the speed at which the alternator is driven by said speed changing device, the combination therewith of: means controlling the application of power for driving said alternator to start and stop said system; time delay means movable from a first state to a second state upon operation of said controlling means to start said system, and from said second state to said first state upon the elapse of a predetermined period after operation of said controlling means to stop said system; means dependent upon the time delay means being in said second state for providing a supplemental power source; means having alternate states for modifying the output of said supplemental power source between normal and high; means for moving said modifying means to high output state upon initial operation of said controlling means to start said system; second time delay means for moving said modifying means to normal output state upon the elapse of a predetermined period after operation of said controlling means to start said system; means operable upon operation of said controlling means to stop said system and dependent upon said first mentioned time delay means being in its said second state for moving said modifying means to high output state whereby said modifying means returns to its low output state when said first mentioned time delay means returns to its said first state; and circuit means operated by said power source for energizing said exciter circuit.

6. In a master speed control system including a speed changing device, an alternator driven by the device, said alternator having an exciter circuit for supplying exciting current for the alternator, and capable of being independently controlled to adjust the excitation, and one or more parallel fed motors connected to the alternator output for operation at a speed correlated to the speed at which the alternator is driven by said speed changing device, the combination therewith of: means controlling the application of power for driving said alternator to start and stop said system; time delay means movable from a first state to a second state upon operation of said controlling means to start said system, and from said second state to said first state upon the elapse of a predetermined period after operation of said controlling means to stop said system; means dependent upon the time delay means being in said second state for providing a supplemental power source; means having alternate states for modifying the output of said supplemental power source between normal and high; means for moving said modifying means to high output state upon initial operation of said controlling means to start said system; second time delay means for moving said modifying means to normal output state upon the elapse of a predetermined period after operation of said controlling means to start said system; means operable upon operation of said controlling means to stop said system and dependent upon said first mentioned time delay means being in its said second state for moving said modifying means to high output state whereby said modifying means returns to its low output state when said first mentioned time delay means returns to its said first state; means dependent upon the operation of said controlling means to stop said system and upon said first mentioned time delay means being in its said second state for adding a substantial load to said alternator output; and circuit means operated by said power source for energizing said exciter circuit.

7. In a master speed control system including a speed changing device, an alternator driven by the device, said alternator having an exciter circuit for supplying exciting current for the alternator, and capable of being independently controlled to adjust the excitation, and one or more parallel fed motors connected to the alternator output for operation at a speed correlated to the speed at which the alternator is driven by said speed changing device, the combination therewith of: means controlling the application of power for driving said alternator to start and stop said system; a circuit controller for energizing the exciter circuit; means for closing said circuit controller in response to operation of said controlling means to start said system; means responsive to operation of said controlling means to stop said system for maintaining the circuit controller closed only for a limited period; and means for increasing the exciting current for a limited period upon initial operation of said controlling means to start said system.

8. In a master speed control system including a driving induction motor, a variable ratio transmission mechanism driven by the motor, an alternator driven by the mechanism, said alternator having an exciter circuit for supplying exciting current for the alternator, and capable of being independently controlled to adjust the excitation, means for energizing and for deenergizing the driving motor, and a plurality of alternating current motors connected in parallel to the alternator output, the combination therewith of: a circuit controller for energizing the exciter circuit; means for closing said circuit controller in response to energization of the driving motor; means responsive to deenergization of the driving motor for maintaining the circuit controlled closed only for a limited period; and a second circuit controller for increasing the exciting current, and maintained in increasing position only while the first circuit controller is closed.

References Cited by the Examiner

UNITED STATES PATENTS

| | | | |
|---|---|---|---|
| 1,077,818 | 11/1913 | Eager | 318—445 X |
| 1,215,094 | 2/1917 | Alexanderson | 318—148 X |
| 1,519,238 | 12/1924 | Clarke | 318—445 X |
| 1,934,505 | 11/1933 | Kenah | 318—148 |
| 1,948,749 | 2/1934 | Evans | 318—148 X |
| 1,971,808 | 8/1934 | Bergvall | 318—148 X |
| 2,018,218 | 10/1935 | Manteith | 318—148 X |
| 2,233,634 | 3/1941 | Newton | 318—87 X |
| 2,279,228 | 4/1942 | Evans et al. | 318—148 |
| 2,356,113 | 8/1944 | Wetherby | 318—148 X |
| 2,539,191 | 1/1951 | Hoffmann | 318—158 |
| 2,559,346 | 7/1951 | Dalton | 318—150 |
| 2,631,263 | 3/1953 | Prince | 318—148 X |
| 2,895,096 | 7/1959 | Wallace | 318—148 X |

FOREIGN PATENTS

| | | |
|---|---|---|
| 19,903 | 12/1911 | Great Britain. |
| 314,457 | 6/1929 | Great Britain. |

ORIS L. RADER, *Primary Examiner.*

JOHN F. COUCH, *Examiner.*